(12) United States Patent
Colin et al.

(10) Patent No.: US 7,973,422 B2
(45) Date of Patent: Jul. 5, 2011

(54) DEVICE FOR PRODUCING ELECTRICAL POWER IN A TWO-SPOOL GAS TURBINE ENGINE

(75) Inventors: Antoine Olivier Francois Colin, Brunoy (FR); Arnaud Lebrun, Noisy sur Ecole (FR); Gilles Barjon, Fontainebleau (FR)

(73) Assignee: SNECMA, Paris (FR)

( * ) Notice: Subject to any disclaimer, the term of this patent is extended or adjusted under 35 U.S.C. 154(b) by 490 days.

(21) Appl. No.: 12/109,929

(22) Filed: Apr. 25, 2008

(65) Prior Publication Data
US 2009/0015011 A1     Jan. 15, 2009

(30) Foreign Application Priority Data
Apr. 27, 2007  (FR) ...................... 07 03105

(51) Int. Cl.
*F01D 15/10* (2006.01)
*F02C 6/00* (2006.01)
*H02K 7/18* (2006.01)
*H02P 9/04* (2006.01)
*F02C 1/06* (2006.01)
*F02C 3/10* (2006.01)

(52) U.S. Cl. .................. 290/52; 310/113; 60/39.163
(58) Field of Classification Search .............. 290/52; 310/113; 60/39.163
See application file for complete search history.

(56) References Cited

U.S. PATENT DOCUMENTS

| | | | | |
|---|---|---|---|---|
| 2,984,975 A | * | 5/1961 | Rodgers et al. | 60/39.08 |
| 3,100,378 A | * | 8/1963 | Austin et al. | 60/791 |
| 3,449,914 A | * | 6/1969 | Brown | 405/215 |
| 3,459,980 A | * | 8/1969 | Coroller | 310/114 |
| 3,663,848 A | * | 5/1972 | Lehoczky | 310/90 |
| 4,718,819 A | * | 1/1988 | Rogo et al. | 415/149.1 |
| 4,776,163 A | * | 10/1988 | Brockmann | 60/792 |
| 4,868,406 A | * | 9/1989 | Glennon et al. | 290/4 R |
| 4,936,748 A | * | 6/1990 | Adamson et al. | 416/123 |
| 5,103,631 A | * | 4/1992 | Edwards et al. | 60/792 |
| 5,205,712 A | * | 4/1993 | Hamilton | 416/155 |
| 5,309,029 A | * | 5/1994 | Gregory et al. | 290/1 R |
| 5,349,814 A | * | 9/1994 | Ciokajlo et al. | 60/226.1 |
| 5,694,765 A | * | 12/1997 | Hield et al. | 60/39.163 |
| 5,793,136 A | * | 8/1998 | Redzic | 310/114 |
| 5,867,979 A | * | 2/1999 | Newton et al. | 60/226.1 |
| 6,049,152 A | * | 4/2000 | Nakano | 310/114 |

(Continued)

FOREIGN PATENT DOCUMENTS
EP    1 876 337 A1    1/2008
(Continued)

OTHER PUBLICATIONS
U.S. Appl. No. 12/246,604, filed Oct. 7, 2008, Colin.

*Primary Examiner* — Pedro J Cuevas
(74) *Attorney, Agent, or Firm* — Oblon, Spivak, McClelland, Maier & Neustadt, L.L.P.

(57) ABSTRACT

A device for producing electrical power in a multi-spool gas turbine engine is disclosed. The device includes at least one first rotary spool and a second rotary spool which drives an electrical machine. The electrical machine is of the twin-rotor type with a first rotor and a second rotor. The first rotor is mechanically connected to the first rotary spool and the second rotor is mechanically connected to the second rotary spool.

15 Claims, 2 Drawing Sheets

U.S. PATENT DOCUMENTS

| | | | |
|---|---|---|---|
| 6,121,705 A * | 9/2000 | Hoong | 310/113 |
| 6,158,210 A * | 12/2000 | Orlando | 60/226.1 |
| 6,211,597 B1 * | 4/2001 | Nakano | 310/266 |
| 6,353,790 B1 * | 3/2002 | Tsuzuki | 701/100 |
| 6,376,955 B1 * | 4/2002 | Arimitsu | 310/114 |
| 6,449,957 B1 * | 9/2002 | Takamatsu et al. | 60/796 |
| 6,467,725 B1 * | 10/2002 | Coles et al. | 244/58 |
| 6,531,844 B1 * | 3/2003 | Tate, Jr. | 320/101 |
| 6,639,337 B1 * | 10/2003 | Nakano | 310/113 |
| 6,710,492 B2 * | 3/2004 | Minagawa | 310/113 |
| 6,794,781 B2 * | 9/2004 | Razzell et al. | 310/114 |
| 6,815,857 B2 * | 11/2004 | Akatsu | 310/114 |
| 6,825,640 B1 * | 11/2004 | Hill et al. | 322/46 |
| 6,867,560 B2 * | 3/2005 | Arimitsu | 318/144 |
| 6,895,741 B2 * | 5/2005 | Rago et al. | 60/226.1 |
| 6,914,344 B2 * | 7/2005 | Franchet et al. | 290/52 |
| 7,240,751 B2 * | 7/2007 | Hoare et al. | 180/65.25 |
| 7,245,040 B2 * | 7/2007 | Mukavetz et al. | 290/52 |
| 7,246,482 B2 * | 7/2007 | Mahoney et al. | 60/204 |
| 7,285,871 B2 * | 10/2007 | Derouineau | 290/52 |
| 7,481,062 B2 * | 1/2009 | Gaines et al. | 60/792 |
| 7,552,582 B2 * | 6/2009 | Eick et al. | 60/39.163 |
| 7,574,867 B2 * | 8/2009 | Teets et al. | 60/792 |
| 7,622,817 B2 * | 11/2009 | El-Refaie et al. | 290/52 |
| 7,642,682 B1 * | 1/2010 | Matheny | 310/90 |
| 7,750,521 B2 * | 7/2010 | Qu et al. | 310/112 |
| 7,788,898 B2 * | 9/2010 | Kern et al. | 60/204 |
| 7,791,235 B2 * | 9/2010 | Kern et al. | 310/103 |
| 7,850,422 B2 * | 12/2010 | Herrmann | 415/161 |
| 7,854,582 B2 * | 12/2010 | Ullyott | 415/1 |
| 7,882,691 B2 * | 2/2011 | Lemmers et al. | 60/39.163 |
| 2006/0108807 A1 * | 5/2006 | Bouiller et al. | 290/52 |
| 2007/0013195 A1 * | 1/2007 | Mukavetz et al. | 290/52 |
| 2008/0143108 A1 * | 6/2008 | El-Refaie et al. | 290/43 |
| 2008/0148881 A1 * | 6/2008 | Moniz et al. | 74/15.6 |
| 2008/0149445 A1 * | 6/2008 | Kern et al. | 192/3.56 |
| 2010/0186418 A1 * | 7/2010 | Beutin et al. | 60/802 |

FOREIGN PATENT DOCUMENTS

| | | |
|---|---|---|
| FR | 772.063 | 10/1934 |
| FR | 2863312 A1 * | 6/2005 |
| GB | 759606 | 10/1956 |
| GB | 2 197 392 A | 5/1988 |

* cited by examiner

DEVICE FOR PRODUCING ELECTRICAL POWER IN A TWO-SPOOL GAS TURBINE ENGINE

BACKGROUND OF THE INVENTION

The present invention relates to the field of multi-spool gas turbine engines used in aeronautics. It is aimed at the way in which auxiliary electrical machines are driven by the shafts of the engine.

In turbine engines used for the propulsion of aircraft, some of the power produced is tapped off to drive auxiliary equipment providing ancillary services both to the engines themselves and to the aircraft. This equipment includes the lubricating and fuel systems, and the power supply for the hydraulic and electrical systems.

A multi-spool gas turbine engine comprises at least two rotary spools; most have two or three spools, but a higher number is not excluded. A spool consists of a unitary assembly rotating about an axis, with one section forming a compressor and one section forming a turbine, the latter driving the compressor. More specifically, a multi-spool engine may also be a multi-flow engine, generally a dual flow or bypass engine, and comprise a fan generating a cold secondary or bypass flow that bypasses the central core containing combustion chamber and through which the hot primary flow passes. The engine may also be of the turboprop type, driving a propeller.

In general, all of the mechanical power needed to drive the auxiliary machines is tapped off the high pressure HP spool via a gearbox known as the IGB which stands for inlet gearbox, and is then transmitted to the equipment situated on the fan casing by a shaft arranged radially with respect to the engine drive shaft, in mesh with a gear set forming the box supporting them and known as the AGB which stands for auxiliary gearbox.

DESCRIPTION OF THE PRIOR ART

The current trend is to increase the supply of electrical power to the accessories. Providing increased mechanical power while at the same time keeping the turbomachine operative throughout its flight envelope entails finding another solution. One solution is to split the tapping of power across all the rotary spools, that is to say across the HP and LP spools a two-spool engine.

Furthermore, whereas gas turbine engines have conventionally been started up by spinning up the HP rotor using an air turbine, the desire is to replace this air turbine with an electric motor. In fact, the desire is to put the increase in power requirements of electric generators to good use by using them reversibly as electric motors. This solution is made possible by the fact that the power of the electrical machines installed is sufficient to spin the rotary spool of the engine.

More specifically, the desire is to produce a means that will allow the tapping of power to be split across the HP and LP spools in order to generate the electrical power. Use is then made of several electrical machines: one machine is driven by the HP spool and another by the LP spool. This technique does, however, entail the processing of electrical signals so that their powers can be combined. The machines may be situated on the axes of the engines or alternatively may be situated at a relay gearbox. A solution such as this does have the disadvantage of being somewhat heavy and definitely bulky.

One solution, such as the one for which the applicant company filed a patent application under the number FR 2 863 312, suggests incorporating one or more electrical machines into the casing on the outside of the engine in the region of the AGB and driving it by means of a differential gear so as to split the tapping of power between the two spools, the HP spool on the one hand, and the LP spool on the other. It will be noted that a solution such as this does not allow one of the electrical machines to drive the rotors on startup.

SUMMARY OF THE INVENTION

It is an object of the present invention to tap off power in such a way that this power can be split as required across the various rotary spools of a multi-spool turbine engine.

Another object of the invention is to allow the same means to be used to drive at least one of the rotary spools during turbine engine startup.

Accordingly, the invention produces a device for producing electrical power in a multi-spool gas turbine engine comprising at least one first rotary spool, for example a low-pressure spool, and a second rotary spool, for example a high-pressure spool, and driving an electrical machine, wherein, with the electrical machine being of the twin-rotor type with a first rotor and a second rotor, the first rotor is mechanically connected to the first rotary spool and the second rotor is mechanically connected to the second rotary spool.

The solution according to the invention has the advantage of allowing the tapping of mechanical power to be split between the two rotary spools without the need to resort to a clutch or gearbox system that would have an impact on the mass of the turbine engine.

Furthermore, the operability of the turbine engine is ensured by the fact that the split in the way in which power is tapped off is consistent between the two rotary spools. This split is controlled by suitable reduction ratios.

In the case of a two-spool engine, it has been demonstrated that tapping power from the LP spool in preference over any other spool allowed a reduction in the specific fuel consumption of a turbine engine.

Thus, according to another feature, the electrical machine is reversible, capable of operating as an electric generator when at least one of the rotors is driven by the rotary spool to which it is connected or alternatively of operating as a motor to drive at least one of the rotary spools thereof.

According to one embodiment, the rotors are each mechanically connected to the rotary spools by speed reducing gearboxes. According to another embodiment, they are mounted directly on the engine.

The mechanical transmission between the first rotor of the electrical machine and the first rotary spool of the turbine engine may comprise a brake, for example a nonreturn ratchet wheel, via which said first rotary spool can be kept stationary. Advantageously, the brake can be used to immobilize the first rotary spool when the engine is at rest. For example, in the case of a turboprop engine with a propeller, in order to prevent the propeller from windmilling when the engine is not running, the LP spool to which the propeller is connected needs to be prevented from turning. The brake described in the present invention is capable of performing this additional function.

However, a brake such as this is not needed when the ratio between the moments of inertia of the HP and LP spools is very great, as is the case with large engines.

Advantageously, the first rotor of the electrical machine is concentric with and inside the second rotor thereof. As a preference, the first rotor is a permanent magnet rotor; this then reduces the amount of contact between stationary and rotating parts.

The invention also relates to a two-spool gas turbine engine comprising at least one such auxiliary electrical machine. As a preference, the gas turbine engine is of the two spool type, the first spool being the low-pressure spool and the second spool the high-pressure spool.

The rotary spool are possibly contrarotating.

This arrangement makes it possible to apply a gas turbine engine startup method that consists in powering the auxiliary electrical machine with electrical power while at the same time keeping the brake applied so as to drive the second rotary spool only during the startup phase.

Using this method of operation it is possible to dispense with the entire transmission system (AGB, transfer gearbox known by the acronym TGB, radial shaft and IGB) and the air turbine and to limit the use of mechanical transmission components. The mass savings achieved at this level offer options for the integration of the new structure.

BRIEF DESCRIPTION OF THE DRAWINGS

The invention is described hereinafter in greater detail with reference to the attached drawings in which.

Figure 1:
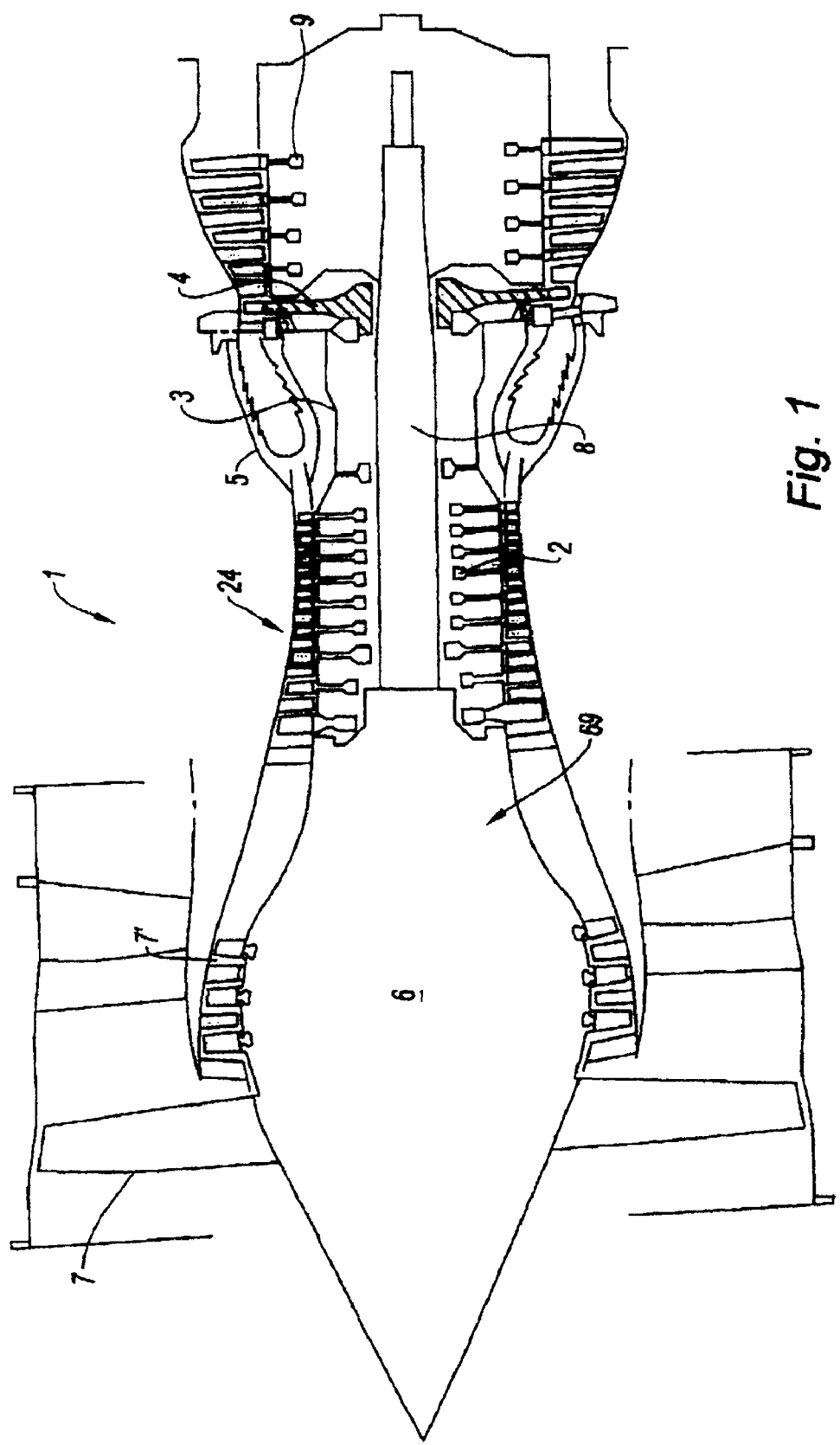
FIG. 1 schematically depicts a two-spool turbojet engine in axial section.

Reference is made first of all to FIG. 1 which schematically depicts a turbomotor arranged as a turbojet engine 1. It is a two-spool engine with a high-pressure HP spool 24 comprising an HP compressor rotor 2 connected by a first shaft 3 to an HP turbine rotor 4. A combustion chamber 5 is formed between the two HP rotors. The low-pressure spool 69 comprises an LP compressor assembly 6, with the fan 7 and the first compression stages 7' positioned upstream of the HP compressor. The LP compressor assembly is connected by a shaft 8 concentric with the first shaft to an LP turbine rotor 9 positioned downstream of the HP turbine rotor 4. The fan delivers an air flow which is split into two concentric flows, a primary flow that passes through the various LP and HP modules before being ejected into the atmosphere, and a cold secondary or bypass flow which bypasses the combustion chamber and is ejected into the atmosphere. In modern commercial engines, the bypass ratio, which is the ratio between the primary and secondary flows, is high; it is at least 4 and is likely in the future to become even higher. Instead of driving a fan, the engine may operate as a turboprop and drive one or more propellers.

An electrical machine is conventionally made up of an induction rotor and of a stator that forms the armature. The rotor is provided with a plurality of pairs of poles, for example 2, 3 or 4 pairs of poles, and the stator that forms the armature is provided with windings. According to the invention, use is made in the application in question of an electrical machine with a rotating stator that forms a second rotor, each of the rotors of the electrical machine being mechanically connected to a rotary spool of the multi-spool turbomotor.

Figure 2:
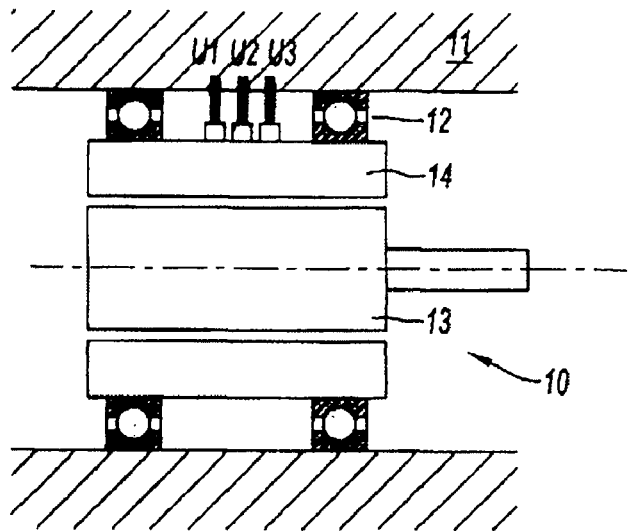
FIG. 2 schematically depicts an electrical machine of the twin-rotor type.

FIG. 2 schematically depicts an electrical machine of the two-rotor type. The machine 10 is mounted on a fixed part 11 of the gas turbine engine via bearings 12. These bearings support two concentric rotors 13 and 14 rotating about the same axis XX. These are a first, induction, rotor 13, preferably of the permanent magnet type in order as far as possible to avoid rotary electrical connections between the moving and stationary parts. It is supported by bearings, not depicted, and is positioned inside the wound second rotor 14 provided, here on its exterior surface, with slip rings for brushes U1, U2, U3 in the case of a three-phase motor. The first rotor 13 is preferably mechanically connected to the low-pressure LP rotary spool 69. The second rotor for its part is mechanically connected to the high-pressure HP rotary spool. It should be noted that in a gas turbine engine that has more than two rotary spools, one of the rotors may be mechanically connected to a spool at an intermediate pressure level.

DESCRIPTION OF THE PREFERRED EMBODIMENTS

Given these background considerations, the way in which the machine is arranged with respect to the rotary spools of the engine can vary.

Figure 3:
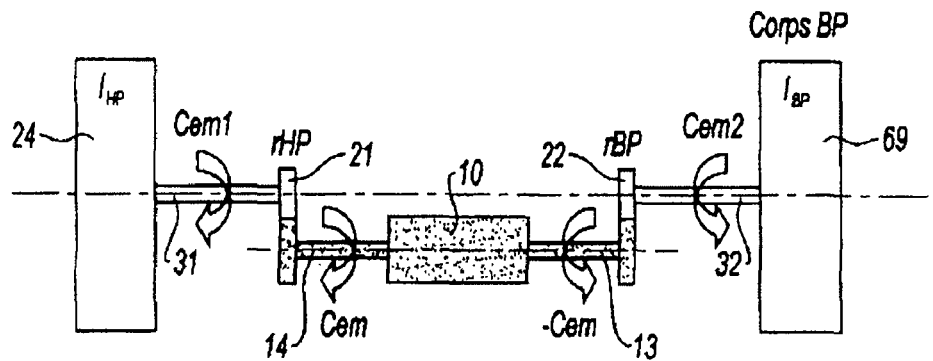
FIG. 3 shows an exemplary layout of the machines.

According to one embodiment, the electrical machine is positioned along or near the axis of the gas turbine engine. The first rotor 13 is then advantageously connected to the LP spool 69 and the second rotor 14 is connected to the HP spool 24. In order to allow drive at appropriate speeds for the electrical machine 10, its two rotors are connected to the two rotary spools by appropriate speed reducing gearboxes. FIG. 3 depicts the operating diagram of this arrangement. The electrical machine 10 is shown with the two shafts of the rotors 13 and 14. These two shafts 13 and 14 are connected by respective HP and LP reduction gearboxes 21 and 22 to the shafts 31 and 32 of the HP and LP spools 24 and 69 respectively. In this example, the two spools of the gas turbine engine are contrarotating with appropriate reduction gearboxes. The solution is also suitable for instances in which the rotary spools are corotating with appropriate reduction gearboxes. The reduction gearboxes fitted have the task, on the one hand, of splitting the tapping of power in a way that will meet the operability conditions and, on the other hand, of ensuring that the electrical machine has a speed of the type:

$$\Omega = r_{LP} \Omega_{LP} + r_{HP} \Omega_{HP}.$$

The electrical machine has the advantage that the rotary spools can be driven at turbomotor startup.

To this end, particularly in the case of engines that are not of a large size, a brake 40 is provided so that the drive power can be split appropriately between the two rotary spools. This brake is arranged in such a way as to immobilize the LP spool. Indeed it should be noted that for large engines in which the low-pressure spool has a great deal of inertia by comparison with the high-pressure spool, for example having of the order of 10 times the inertia, the use of a brake can be avoided because the HP spool starts before the LP spool. In smaller-sized engines the difference in inertia is also smaller and the brake is then of use.

Figure 4:
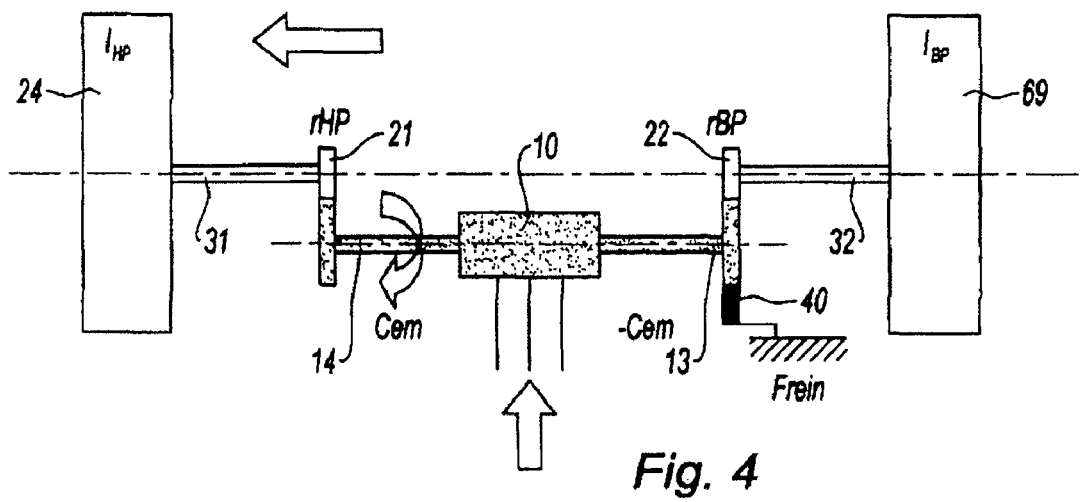
FIG. 4 shows how it works as a starter.

FIG. 4 depicts the way in which the invention is designed to operate in startup mode. Electrical power is supplied to the machine 10 which is made to operate as an electric motor. The brake 40 is applied in such a way as to immobilize the LP rotary spool 69. In this case, the rotor 14 connected to the HP rotary spool 24 is rotated and drives the LP spool 24 of the turbomotor 1. All of the power developed by the electrical machine is thus absorbed by the HP spool 24.

When the HP spool 24 has reached a determined speed, the brake 40 on the LP spool 69 is released. The electrical power supplied to the machine 10 is then split between the two rotary spools and the LP spool is in turn driven. Ignition takes place when the thermodynamic conditions of ignition are achieved.

When the rotation of the turbomotor is self-sustaining, the supply of electrical power to the electrical machine 10 is interrupted. The rotors are mechanically driven; the machine 10 works as an electric generator.

According to an alternative form that has not been depicted, the electrical machine is positioned on the fan casing. It is mounted on the AGB as in the conventional solutions for the support and drive of auxiliary machines. The mechanical power is conveyed by means of two radial shafts positioned in the arms of the engine's intermediate casing. These two radial shafts are mechanically connected one to each of the rotary spools.

According to an alternative form that has not been depicted, the electrical machine is positioned in the main axis of the engine, for example in the intermediate casing between the LP and HP compressors. The rotors are directly driven by the HP and LP parts of the engine in the event that said HP and LP parts are corotating or via a system that reverses the direction of rotation in the event that said HP and LP parts are contrarotating.

The invention claimed is
1. A device for producing electrical power in a multi-spool gas turbine engine comprising:
   at least one first rotary spool;
   a second rotary spool; and
   a twin-rotor electrical machine driven by the first rotary spool and the second rotary spool, the electrical machine including a first rotor and a second rotor,
   wherein the first rotor is mechanically connected to the first rotary spool and the second rotor is mechanically connected to the second rotary spool,
   wherein the electrical machine is reversible, capable of operating as an electric generator when at least one of the rotors is driven by the rotary spool to which it is connected or alternatively of operating as a motor to drive at least one of the rotary spools,
   wherein the first rotor is concentric with the second rotor and disposed inside the second rotor.
2. The device as claimed in claim 1, wherein the first and second rotors are mechanically connected to the first and second rotary spools by first and second speed reducing gearboxes, respectively.
3. The device as claimed in claim 2, wherein a shaft of the first rotor and a shaft of the first rotary spool are connected to the first gearbox, and a shaft of the second rotor and a shaft of the second rotary spool are connected to the second gearbox.
4. The device as claimed in claim 1, wherein the rotors are mechanically connected to the rotary spools by direct drive.
5. The device as claimed in claim 1, wherein mechanical transmission between the first rotor and the first rotary spool comprises a brake via which the first rotary spool can be kept stationary.
6. The device as claimed in claim 5, wherein the brake includes a ratchet wheel.
7. The device as claimed in claim 1, wherein the first rotor is a permanent magnet rotor.
8. A two-spool gas turbine engine comprising at least one twin-rotor electrical machine as claimed in claim 1.
9. The gas turbine engine as claimed in claim 8, wherein the first spool is a low-pressure spool and the second spool is a high-pressure spool.
10. The gas turbine engine as claimed in claim 8, wherein the rotary spools are contrarotating.
11. A method of starting the gas turbine engine as claimed in claim 8, comprising supplying the machine with electrical power in order to drive one of the rotary spools.
12. A method of starting a gas turbine engine as claimed in claim 8, comprising:
   incorporating a brake between the first rotor and the first rotary spool which keeps the first rotary spool stationary;
   supplying the machine with electrical power while keeping the brake applied so as to drive the second rotary spool alone until a determined rotational speed is reached; and
   releasing the brake when the determined rotational speed is reached.
13. The device as claimed in claim 1, wherein the first rotor is supported inside the second rotor by bearings.
14. The device as claimed in claim 1, wherein the electrical machine is mounted on a fixed part of the gas turbine engine via bearings.
15. The device as claimed in claim 1, wherein the first rotary spool is a low pressure spool and the second rotary spool is a high pressure spool.

* * * * *